US012439106B2

(12) United States Patent
Lal et al.

(10) Patent No.: US 12,439,106 B2
(45) Date of Patent: Oct. 7, 2025

(54) BANDWIDTH-ADAPTIVE LIGHT FIELD VIDEO TRANSMISSION ON MOBILE AND PORTABLE DEVICES

(71) Applicant: Adeia Guides Inc., San Jose, CA (US)

(72) Inventors: Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 41 days.

(21) Appl. No.: 17/966,556

(22) Filed: Oct. 14, 2022

(65) Prior Publication Data

US 2024/0129564 A1  Apr. 18, 2024

(51) Int. Cl.
*H04N 21/2385* (2011.01)
*H04N 21/24* (2011.01)

(52) U.S. Cl.
CPC ..... *H04N 21/2385* (2013.01); *H04N 21/2402* (2013.01)

(58) Field of Classification Search
CPC ............ H04N 21/2385; H04N 21/2402
See application file for complete search history.

(56) References Cited

U.S. PATENT DOCUMENTS

| | | | |
|---|---|---|---|
| 2014/0169192 A1* | 6/2014 | Zhang | H04W 24/08 370/252 |
| 2018/0322691 A1 | 11/2018 | Mitchell et al. | |
| 2020/0106959 A1* | 4/2020 | Molina | H04N 23/698 |
| 2022/0264080 A1* | 8/2022 | Harviainen | H04N 21/2343 |

OTHER PUBLICATIONS

"Kush Gauge," Captain Bodgit, http://captainbodgit.blogspot.com/p/blog-page_22.html.
"Cisco Visual Networking Index: Global Mobile Data Traffic Forecast Update, 2017-2022," White Paper, Cisco Public (Feb. 2019).
"Light Field Imaging Technology," Tech Briefs, Mar. 1, 2021. https://www.techbriefs.com/component/content/article/tb/supplements/pit/features/technology-leaders/38622.
"Light Field Selfie Camera," WOOPTIX, https://wooptix.com/solutions/selfie-camera/.
"Lytro Lightfield Camera—General Info," LightField Forum. http:/lightfield-forum.com/lytro/lytro-lightfield-camera/.

(Continued)

*Primary Examiner* — Yassin Alata
(74) *Attorney, Agent, or Firm* — HALEY GUILIANO LLP (57) ABSTRACT

Systems and methods for bandwidth-adaptive light field video transmission on mobile and portable devices is disclosed. An upstream bandwidth is estimated. A request for a service tier for capture and transmission of light field content is received, wherein the light field content comprises an image array of a plurality of sub-aperture images. When the requested service tier is greater than the estimated upstream bandwidth, a reduced service tier is determined based on the estimated upstream bandwidth. A number of sub-aperture images comprising a reduced image array is determined based on the reduced service tier. The image array is reduced to the reduced image array based on feature saliency and adjacency of sub-aperture images. Resources corresponding to the reduced service tier are provided for capture and transmission of the reduced image array.

18 Claims, 6 Drawing Sheets

(56) References Cited

OTHER PUBLICATIONS

"SIMD in the GPU World," RasterGrid Kft., https://www.rastergrid.com/blog/gpu-tech/2022/02/simd-in-the-gpu-world/.
"What Percentage of Internet Traffic is Mobile?," Oberlo, https://www.oberlo.com/statistics/mobile-internet-traffic.
"World's First Holographic Smartphone Is Already There : The Future Is Now!," YouTube, https://www.youtube.com/watch?v=nmzEe8j1TSM (Jun. 2018).
Gonzalez, Barb, "Internet Speed Requirements for Video Streaming," LifeWire, https://www.lifewire.com/internet-speed-requirements-for-movie-viewing-1847401 (Nov. 2020).
Hollister, Sean, "Looking Glass might have just invented the GIF's 3D successor," The Verge, Jun. 1, 2022. https://www.theverge.com/23132875/looking-glass-blocks-3d-vr-sharable-image.
Ip, Andrew et al., "The Cable Network, Immersive Experiences and Lightfields," Broadband Library. https://broadbandlibrary.com/the-cable-network-immersive-experiences-and-lightfields/.
Kim, Meejin, et al., "Fusion Poser: 3D Human Pose Estimation Using Sparse IMUs and Head Trackers in Real Time," Sensors 2022, 22, 4846. Https://doi.org/10.3390/s22134846.
Koniaris, Babis, et al., "Real-time Rendering with Compressed Animated Light Fields," Graphics Interface 2017, May 16, 2017.
Levoy, Marc, et al., "Light Field Rendering," Computer Science Department, Stanford University, Jul. 1996.
Marin-Jimenez, Manuel J. et al., "3D human pose estimation from depth maps using a deep combination of poses," arXiv:1807.05389v1, Jul. 17, 2018.
Maguey, Thomas, et al., "Interactive Multiview Video System With Low Complexity 2D Look Around at Decoder," IEEE Transactions on Multimedia, vol. 15, No. 5 (Aug. 2013).
Moss, Brent, "Want to See How Much Mobile Data Traffic is Video? (Hint: So Much!)," NabAmplify, https://amplify.nabshow.com/articles/video-represents-69-of-mobile-data-traffic-growing-to-79-by-2027-source-rapidtvnews/ (Dec. 2021).
Pascual-Hernandez, David et al., "Efficient 3D human pose estimation from RGBD sensors," Displays, vol. 74, https://doi.org/10.1016/j.displa.2022.102225 (Sep. 2022).
Pichler, Benjamin, "HDR Light Field," Department of Computer Science (Institute of Computer Graphics), Johannes Kepler University Linz, Oct. 9, 2012.
Purcher, Jack, "Apple wins a major Light Field Camera patent that will allow iPhone owners to use Gestures to capture scenes from different positions & more," PatentlyApple, https://www.patentlyapple.com/2021/06/apple-wins-a-major-light-field-camera-patent-that-will-allow-iphone-owners-to-use-gestures-to-captur.html (Jun. 2021).
Segan, Sascha, "RED Hydrogen One Review," PCMag, https://www.pcmag.com/reviews/red-hydrogen-one (Dec. 2018).
Wu, Gaochang, et al., "Light Field Image Processing: An Overview," Journal of Latex Class Files, vol. XX, No. X, Oct. 2017.
Haixu Han et al., "Plenoptic Image Compression via Simplified Subaperture Projection," Sep. 19, 2018, Sat. 2015 18th International Conference, Austin TX, USA, Sep. 24-27, 2015, pp. 274-284 Lecture Notes.
PCT International Search Report and Written Opinion for PCT/US2023/034953, dated Jan. 25, 2024.
Tu Wang et al., "Efficient Content Adaptive Plenoptic Video Coding," IEEE Access, IEEE, USA, vol. 8, Jan. 6, 2020, pp. 5797-5804.

* cited by examiner

BANDWIDTH-ADAPTIVE LIGHT FIELD VIDEO TRANSMISSION ON MOBILE AND PORTABLE DEVICES

BACKGROUND

The present disclosure relates to capture and transmission of light field content, in particular to techniques for dynamically capturing and transmitting light field content in varying network conditions.

SUMMARY

An increasing percentage of mobile data traffic includes mobile video traffic. This percentage is set to continue to rise. Sophisticated forms of multimedia, including light field video (spatial videos, resulting in a 3D viewing experience), high level of detail 3D video (millions of polys), photorealistic or physically based rendering (PBR) such as ray traced 3D video, and other holographic formats are demanding of network resources, compute resources, storage resources, and the like. Access to these multimedia experiences may be divided, where regions with better access to network resources (e.g., high throughput, low-latency regions) may have better support for light field video traffic than regions with lesser access to network resources (e.g., low throughput, high-latency regions). Accordingly, there is a need for improved methodologies for capturing and transmitting light field content in varying network conditions.

In accordance with some embodiments disclosed herein, some of the above-mentioned limitations are overcome by estimating an upstream bandwidth; receiving, from the capture device, a service tier request for resources for transmission and processing of the light field media content captured by the capture device, the light field media content comprising an image array; determining that a bandwidth associated with the requested service tier is greater than the estimated upstream bandwidth; determining a reduced service tier based on the estimated upstream bandwidth; determining parameters for reducing the image array based on the reduced service tier; allocating, to the capture device, resources corresponding to the reduced service tier for transmission of the reduced image array; and allocating, in a cloud system, resources corresponding to the reduced service tier for processing the transmitted reduced image array.

According to some embodiments, the described invention further comprises determining the bandwidth associated with the requested service tier is not greater than the estimated upstream bandwidth; allocating, to the capture device, resources corresponding to the requested service tier for transmission of the image array; and allocating, in the cloud system, resources corresponding to the requested service tier for processing the transmitted image array.

According to some embodiments, the described invention further comprises estimating the upstream bandwidth periodically; in response to determining a drop in the upstream bandwidth, determining the bandwidth associated with the reduced service tier exceeds the dropped upstream bandwidth; determining a second reduced service tier based on the dropped upstream bandwidth; determining parameters for reducing the image array to a second reduced image array; allocating, to the capture device, resources corresponding to the second reduced service tier for transmission of the second reduced image array; and allocating, in the cloud system, resources corresponding to the second reduced service tier for processing the transmitted second reduced image array.

According to some embodiments, the parameters comprise determining a number of sub-aperture images from the image array based on the reduced service tier and selecting each of the number of sub-aperture images from the image array, wherein the reduced image array comprises the selected sub-aperture images. In an embodiment, each of the number of sub-aperture images may be selected from the image array based on maximizing feature saliency of the image array. In an embodiment, each of the number of sub-aperture images is selected from the image array such that each selected sub-aperture image is adjacent to at least one other selected sub-aperture image.

According some embodiments, the transmission of the reduced image array at the reduced service tier corresponds to a reduced cone of view of the light field media content when rendered at a display device. In another embodiment, the transmission of the reduced image array at the reduced service tier minimizes a loss of quality of the rendered light field media content resulting from the reduced cone of view.

According to some embodiments, a type of the cone of view comprises at least one of a parallax in all cardinal directions, asymmetrical parallax, horizontal parallax, vertical parallax, or diagonal parallax. In an embodiment, determining the type of the cone of view for rendering at the display device is based on at least one of the reduced service tier, maximizing feature saliency, maximizing perspective-accurate viewing, or supporting a particular parallax.

According to some embodiments, the resources comprise at least one of a network resource, compute resource, or storage resource. According to some embodiments, the capture device is coupled to at least one of a camera or a microlens array.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

Figure 1:
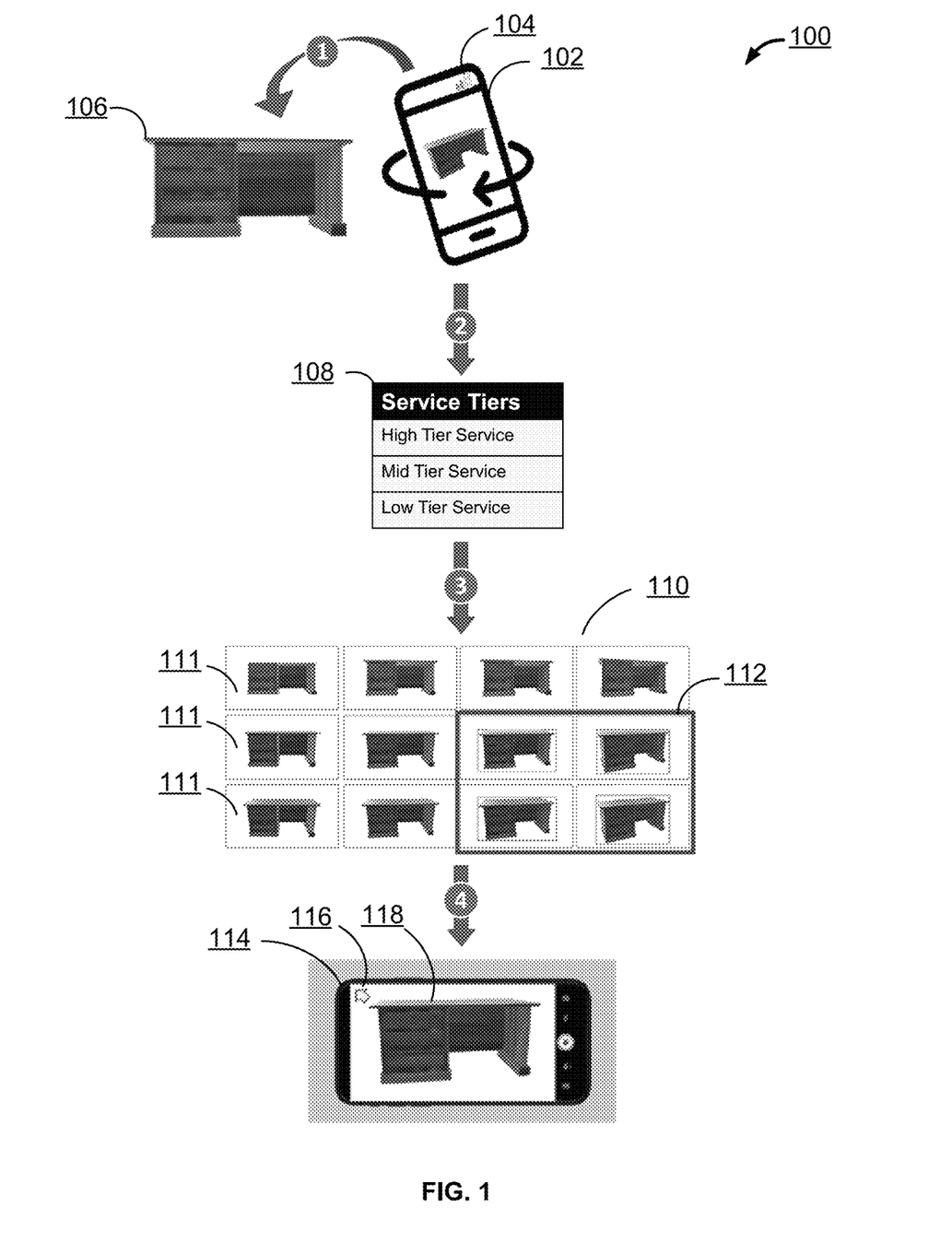
FIG. 1 shows an illustrative technique for using a system for bandwidth-adaptive light field content transmission, in accordance with some embodiments of this disclosure.

FIG. 1 shows an illustrative technique for using a system for bandwidth-adaptive light field content transmission, in accordance with some embodiments of this disclosure. In one embodiment, at step 1, a mobile device 102 captures light field images (e.g., image array 110) of a scene 106 or subject (e.g., a desk) and broadcasts the light field content live over varying network conditions (e.g., current network condition 104, such as a reduced bandwidth). The live broadcast of light field content can be a streaming 3D video in light field format. In another embodiment, the live broadcast is processed in real-time and rendered to viewers as a spatial video (e.g., perspective-accurate viewing) based on each viewer's viewpoint. For example, even as a broadcast, each viewer receives a personalized video on their respective device, based on the viewer's pose.

For real-time processing of the light field images, the light field images must be captured at frame rate. The capture requires a camera or microlens array to capture a scene from multiple viewpoints, resulting in the capture of the scene 106 as an image array 110 (also referred to as a mosaic or a frame in video). The image array 110 is a 4D light field, represented as a 2D array of images. Image array 110 comprises a plurality of sub-aperture images 111 (also referred to as tiles, pinhole views, or views in the frame). The resolution of each sub-aperture image 111 in the large image array 110 is the resolution per view. The higher the resolution per view, the greater the fidelity of the displayed image (e.g., upon rendering). The resolution of per view of each sub-aperture image 111 can depend on the capabilities of a camera or microlens array (for example, the camera coupled to mobile device 102). The number of sub-aperture images (also referred to as the number of views per frame) indicates the inherent flexibility of the light field (e.g., image array 110) in displaying an accurate-perspective viewing of the scene 106 or subject, despite high angular displacement between a viewer and display of the rendered light field content. In one embodiment, large image arrays may pack 50-250 sub-aperture images in one large mosaic image.

Mobile device 102 (also referred to as a capture device) can be any portable device with camera functionality fitted for light field volume capture. For example, the mobile device 102 can include an array of cameras or camera modules, a single camera or camera lens fitted with a microlens array, a plenoptic camera, etc. In an embodiment, mobile device 102 includes a plenoptic camera, wherein large digital imaging sensors that place a microlens array in between the lens and the image sensor allows a single camera to capture an array of images from different angles and with different viewpoints. In the example, mobile device 102 can capture light field images of the scene 106 or subject by rotating such that its camera (or microlens array) can capture the scene 106 or subject from multiple viewpoints, resulting in image array 110.

At step 3, mobile device 102 makes a request for resources (also referred to as a service tier request) for processing the image array 110, and service tiers 108 provide resources based on the request and network condition 104. Real-time processing of light field content is demanding of resources, for example, by requiring high bandwidth, low latency, and heavy compute. In an embodiment, such resources may be provided by a cloud network in a tiered structure (e.g., among service tiers 108), wherein each service tier includes a different level of quality of service, such as different quantities of compute resources (e.g., high compute units available at low latency, etc.), storage resources, network resources (e.g., bandwidth, low jitter, etc.), and the like. In an embodiment, service tiers 108 are specified by the engagement from the cloud or the network on the parameters of storage and compute. In other embodiments, service tiers may be specified by a combination of storage, compute, speed, or bandwidth. The service tier 108 provided can be determined by a service request and/or the network condition 104. As the service request or network conditions 104 change, so can the service tier 108 that is provided. For example, in favorable network conditions at the point of capture of the light field, the system may provide higher service tiers for multimedia storage and rendering (e.g., resulting in perspective-accurate videos on a viewing device 114). Thus, in higher tiers, the system may deliver more powerful compute, higher bandwidth, higher network storage, etc., to deliver and process more demanding multimedia formats (e.g., light field content). If network conditions 104 are unfavorable, a lower service tier is provided. Thus, in lower tiers, the system may engage less network compute and utilize simple media delivery formats and players.

A request for a service tier may be made to the system, and the requested service may depend on the capabilities of the light field camera (or camera array) of mobile device 102. For example, the camera may be optimally capable of capturing an image array having a particular frame resolution (e.g., 16K, 8K, 4K, etc.) wherein each sub-aperture image has a specific resolution per view (also referred to as resolution per sub-aperture image, e.g., 1280×780, etc.) and a particular number of views per frame (also referred to as number of sub-aperture images per frame). The requested service tier may request for a level of resources to support capture and transmission of an entire image array having the particular frame resolution, resolution per view, and the number of views per frame (in this example, all views per frame). The request can seek resources sufficient for processing of such an image array. For example, a request from mobile device 102 may be made to the system requesting a particular level of bandwidth and/or storage availability. The system estimates the current network condition 104, such as the current upstream bandwidth, storage availability, and the like, and determines whether it is capable of supporting the requested service tier. For example, when network resources are largely and readily available, the system can provide the resources to the requesting device at the requested service tier. When the availability of network resources is insufficient to support the requested tier, the system determines a reduced service tier based on the current network condition. In an embodiment, the reduced service tier may require that the image array be reduced for capture and transmission, and parameters for reducing the image array may be determined based on the reduced service tier. The provisioning of service tiers can be dynamic and correlated with the current network condition. Thus, if network resources continue to drop, so does the service tier provided.

In an embodiment, a request is made for a service tier supporting real-time processing of light field content (for example, processing the content online in real-time, such as in a live broadcast). The request may be preconfigured to initially request the highest service tier, such as the highest bandwidth available or the highest bandwidth needed to process the entire image array in real-time. The system estimates the current network condition 104 (for example, the upstream bandwidth available). When the upstream bandwidth is plentiful (e.g., exceeds the bandwidth requested or there is little to no network usage by other devices, etc.) and stable, the network can support transmission of the full image array 110 of each video frame. In other words, the highest service tier is available and can accommodate the requested service tier. Accordingly, the highest service tier is provided, for example, wherein a compute unit is allocated as soon as it is available, and the light field video is written into the compute unit's RAM for further CPU/GPU based processing.

At step 3, when the current network condition 104 (e.g., upstream bandwidth) does not exceed the requested service tier (e.g., requested bandwidth), the system determines a reduced service tier based on how much upstream bandwidth is available and reduces the number of sub-aperture images per frame to a reduced image array 112. Because the reduced image array 112 has a smaller number of views per frame than the original image array 110, less resources are required to process the reduced image array 112. Thus, the system provides resources at the reduced service tier.

In another embodiment, the request is made for a service tier supporting rendering a stored light field video image array (e.g., image array 110) into an arbitrary-viewpoint light field offline. The requested service tier may demand, for example, a cloud storage associated with a user of mobile device 102 for storage of the entire image array, deferring processing. If the system determines that the network condition 104 (e.g., the storage availability on the cloud) exceeds the requested amount of storage, then storage resources are provided at the highest tier. Thus, the entire image array can be stored. If the storage availability does not exceed the requested storage amount, then the system provides storage resources at a reduced service tier. In order for the image array 110 to be stored at the reduced service tier, the image array 110 may be reduced to reduced image array 112.

At step 4, the reduced image array 112 is processed and rendered (e.g., rendered image 118) on a viewing device 114 (also referred to as a display device). In an embodiment, the number of sub-aperture images per frame captured and transmitted is correlated with a cone of view 116 of the rendered image 118. Reducing the number of views per frame from the image array 110 to the reduced image array 112 results in a reduced cone of view 116 (e.g., look-around). A reduced cone of view may result in reduced perspective-accurate viewing (e.g., rendering and transmission of a light field image for each viewer occurs based on their respective viewpoint). For example, look-around viewing of the rendered reduced image array 118 may include a reduced range of viewpoints and be supported in limited viewing directions (e.g., the range of view is reduced, wherein the rendered image 118 can be viewed between looking straight ahead and looking toward the upper left corner). Likewise, when bandwidth increases, look-around increases (e.g., the rendered image 118 can be viewed from a wider range of head rotations), and perspective-accurate viewing increases due to the increased number of sub-aperture images per frame transmitted. Selecting a reduced image array 112 and the resulting cone of view 116 and rendering of perspective-accurate viewing of the scene 106 are discussed in further detail in FIG. 3.

Figure 2:
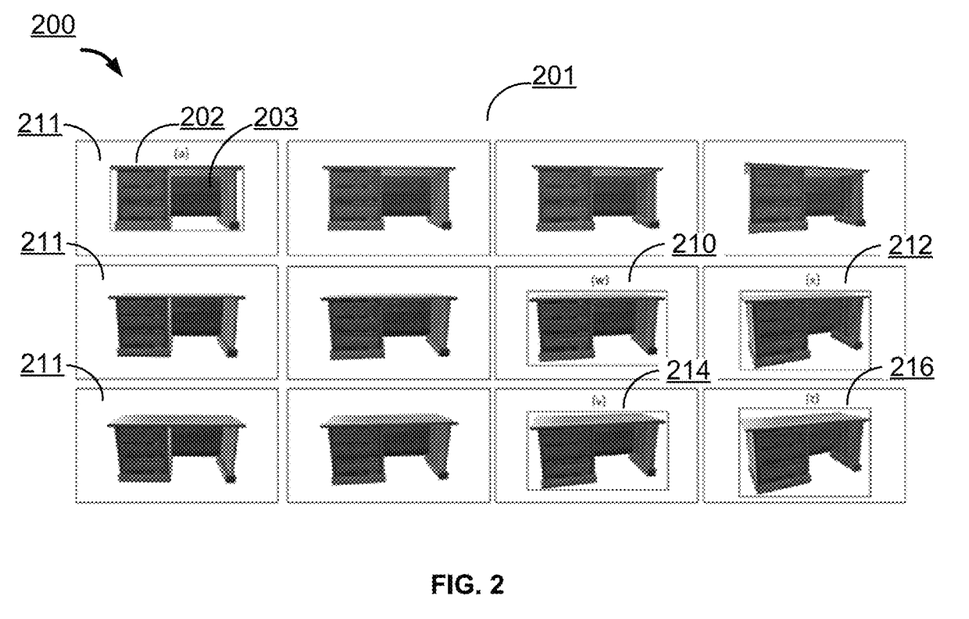
FIG. 2 shows an illustrative technique for reducing an image array for light field content capture and transmission, in accordance with some embodiments of this disclosure.

FIG. 2 shows an illustrative technique 200 for reducing an image array 201 for light field content capture and transmission, in accordance with some embodiments of this disclosure. In the example, image array 201 from a light field video comprises 12 views per frame (e.g., a 4×3 array of sub-aperture images 211). In an embodiment, the system may select a reduced image array (e.g., a subset of sub-aperture images from image array 201) based on feature saliency. Salient features may include distinctive visual elements of an image. In an embodiment, a local or cloud compute unit may be engaged to determine video feature saliency (e.g., the angular representations of the video that maximize salient features) when determining which sub-aperture images to select for the image set comprising the reduced image array.

The number of sub-aperture images for the reduced array image is determined based on the current network conditions (and the corresponding service tier). For example, the estimated upstream bandwidth may be unable to support transmission of the full 4×3 array but can support transmission of a smaller image array of size 2×2. Accordingly, the number of sub-aperture images for the reduced image array at this reduced service tier is 4 sub-aperture images per frame. The 4 sub-aperture images make up an image set (which comprises the reduced image array) and are chosen by their tile position in the image array 201. In an embodiment, when transmitting the reduced image array, the system determines the tile positions of the image set and transmits each frame at the fixed tile positions. For example, if the image set is determined to comprise a 2×1 reduced image array from an original image array of 5×5 sub-aperture images. The selected sub-aperture images are at positions (3, 3) and (4, 3) in the original image array. The system will transmit each frame at tile positions (3, 3) and (4, 3) for rendering. The frames may be transmitted at the fixed tile positions until the final frame of the light field content has been transmitted, until a particular period of time, or until a change in network condition occurs (e.g., a drop in bandwidth).

In the example, the image set is selected to maximize feature saliency of the captured scene. A bounding box may be applied to the number (e.g., 4) of sub-aperture images to represent a target object of interest 203 (e.g., the desk) in a scene in the light field video. The positions of the 2×2 subset of sub-aperture images can be selected to maximize an aggregate size of the bounding boxes across a plurality of frames. Based on receiving a certain number of image array frames (e.g., a mosaic video), the system may select the 2×2 image set comprising sub-aperture images 210 (e.g., tile "w"), 212 (e.g., tile "x"), 214 (e.g., tile "y"), and 216 (e.g., tile "z"), which maximizes the aggregate bounding box size of the object of interest 203 in the capture. The system can transmit the reduced image array by transmitting each frame only at the tile positions 210, 212, 214, 216 (e.g., for a period of time, or until there are no more frames, etc.). When the image set comprises a subset of sub-aperture images from the large image array 201, rendering the transmitted reduced image array results in a 3D video with reduced cone of vision. In the example, the resulting rendered object of interest can be viewed from a viewpoint supporting head movements to and from the upper left corner of a display.

In another embodiment, the estimated upstream bandwidth is unable to support transmission of the 2×2 array but can support transmission of a smaller image array comprising a single sub-aperture image. A bounding box is applied around the object of interest 203 in the sub-aperture image and the bounding box is maximized. For example, the object of interest 203 in each sub-aperture image 211 may be surrounded by a single bounding box, and the size of each bounding box is compared to another until the largest bounding box is identified. In the example, the bounding box around object of interest 203 in sub-aperture image 216 (e.g., tile "z") is the largest bounding box, whereas the bounding box around the object of interest 203 in sub-aperture image 202 (e.g., tile "a") is the smallest. Based on receiving a certain number of image array frames (e.g., a mosaic video), the system may select the sub-aperture image 216 as having the maximum bounding box size over the course of the frames. The system can transmit the reduced image array by transmitting each frame at the same single tile position 216 (e.g., for a period of time, or until there are no more frames, etc.). In an embodiment, when the image set comprises a single sub-aperture image, rendering the transmitted reduced image array results in a 2D video.

In yet another embodiment, other saliency criteria (for example, color, distinctive shapes, and the like) may be used to determine the tile positions which make up the image set. In another embodiment, the image set may be selected based on a particular region of interest and/or a resulting viewpoint. For example, user preferences or preconfigured settings may select an image set which focuses on the object of interest from a center viewpoint. A reduced image array having a size of 6 sub-aperture images may include six tile positions located in the center of the original large image array. Reducing the image further, for example, to a size of 2 sub-aperture images may include the two center-most tile positions of the large image array.

Figure 3:
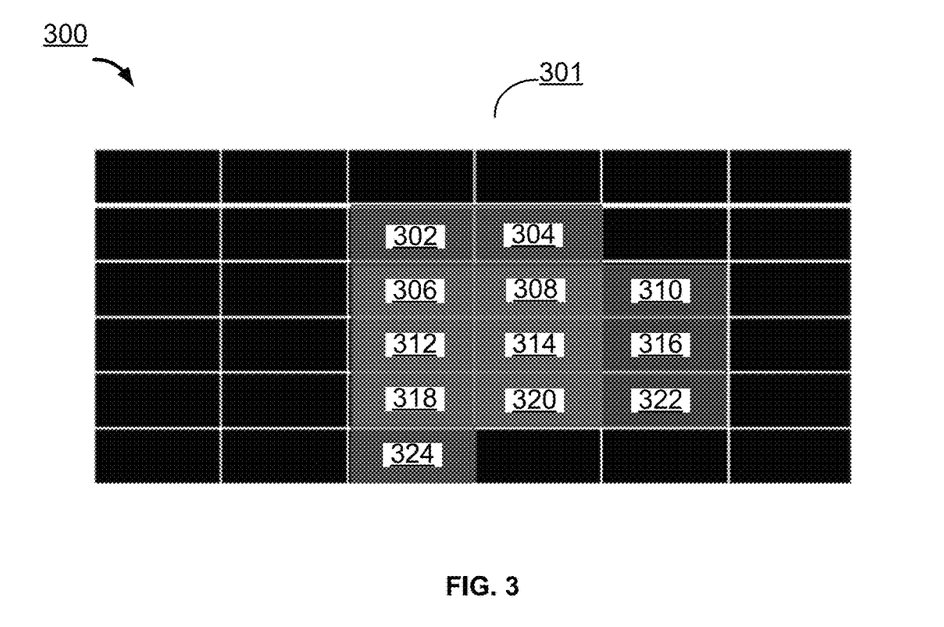
FIG. 3 shows another illustrative technique for reducing an image array for light field content capture and transmission, in accordance with some embodiments of this disclosure.

FIG. 3 shows another illustrative technique 300 for reducing an image array for light field content capture and transmission, in accordance with some embodiments of this disclosure. In an embodiment, when the image array 301 must be reduced to a subset number of views (e.g., based on the network condition, such as available upstream bandwidth, storage availability, etc.), the image set is selected based on adjacency of the tile positions of the sub-aperture images. In another embodiment, the image set is selected based on a combination of tile position adjacency and maximizing feature saliency, for example, of a particular object of interest in the image array 301 (as described above in FIG. 2). Selecting the image set such that each of its sub-aperture images is adjacent to at least another sub-aperture image in the image set allows for high quality rendering of the reduced image array, even though the cone of view is reduced due to the reduced number of sub-aperture images in the image set.

In the example, an 8K frame (e.g., a 6×6 image array 301) comprises 36 sub-aperture images, wherein each sub-aperture image has a resolution per view of 1280×720 p. The image array 301 may be reduced to a 4K frame having 9 sub-aperture images (e.g., based on maximizing feature saliency). Reducing the image array reduces the cone of vision (e.g., the look-around effect is reduced to the range of viewpoints as limited by the selected sub-aperture images). In an embodiment, the sub-aperture images chosen which maximize feature saliency are also adjacent (e.g., by tile position) to each other. In a light field, array images are ordered based on the original camera or microlens array setup, wherein adjacent sub-aperture images have the least angular separation (e.g., 1 degree) from each other than from the tile positions of other sub-aperture images. In an embodiment, the selected sub-aperture images are adjacent, wherein each sub-aperture image represents a view that is different from the view of its neighboring sub-aperture image by a minimum value, such as a minimum distance, a minimum angular separation, and so forth. Selecting an image set comprising adjacent sub-aperture images results in maintaining high-quality rendering (or minimizing quality loss) even when the image array is reduced (e.g., from an 8K frame to 4K frame), and the cone of view and perspective-accurate viewing are reduced (e.g., viewpoints are limited to those supported by the image set of the 4K frame, and the range of head movement is reduced at the display that leads to perspective-accurate viewing). For example, an image set comprising adjacent sub-aperture images allows for application of rendering techniques such as feature matching, view interpolation, etc. within the reduced cone of view, which can be used to render an arbitrary viewpoint within such cone of view. Sub-aperture images outside of the cone of view are not sent, so the renderer cannot produce arbitrary-viewpoint images outside of the cone of view, wherein producing arbitrary-viewpoint images outside the cone of view may lead to low quality rendering (e.g., due to high angular displacement between viewer and display, and the like).

Different image sets may be selected which fit the maximum feature saliency criterion and the adjacency criterion. For example, one reduced image set (e.g., a 4K frame having 9 sub-aperture images) may include adjacent sub-aperture images 302, 304, 306, 308, 312, 314, 318, 320, and 324. In another example, a reduced image set of the same number of sub-aperture images and/or similar level of feature saliency may comprise adjacent sub-aperture images 306, 308, 310, 312, 314, 316, 318, 320, and 322. The cones of view between the two alternative reduced image sets may be different. For example, the first reduced image set (302, 304, 306, 308, 312, 314, 318, 320, and 324) may limit a horizontal parallax (e.g., side to side head movement) but allow for vertical parallax (e.g., up and down head movement). Meanwhile, the second reduced image set (306, 308, 310, 312, 314, 316, 318, 320, and 322) may limit vertical parallax but allow for horizontal parallax.

Figure 4:
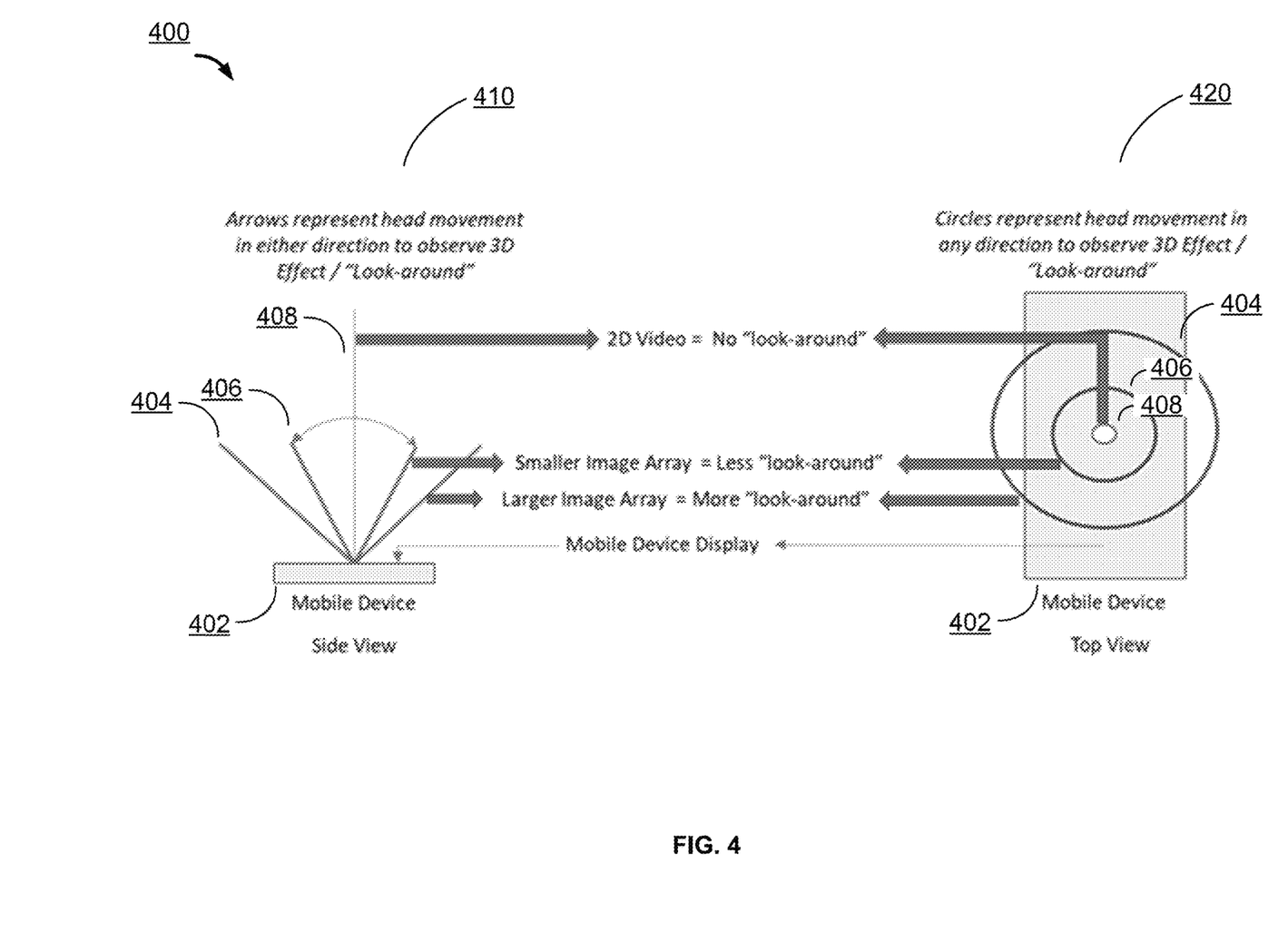
FIG. 4 shows example cones of view resulting from capture and transmission of light field content in varying network conditions, in accordance with some embodiments of this disclosure.

FIG. 4 shows example 400 of various cones of view resulting from capture and transmission of light field content in varying network conditions, in accordance with some embodiments of this disclosure. In an embodiment, when live light field content is generated and transmitted over a network with fluctuating network conditions (e.g., storage, bandwidth, wireless medium that is used to transmit a live event, availability of compute units, etc.), network condition estimation (e.g., bandwidth estimation) can be used to determine the range of the cone of view (e.g., look around or 3D effect when viewing the rendered content). Moreover, the range of the cone of view may determine the perspective accuracy of the rendered content, for example, whether the range of the cone of view supports enough viewpoints. Greater availability of upstream bandwidth allows for a larger image array to be transferred per frame, while reduced bandwidth triggers the capture, encode, and transmit pipeline to reduce the image array at its source. Thus, the size of the encoded and transmitted image array may be dynamically varied to match available bandwidth (or other varying network resource).

In the example, various cones of view corresponding to image array size (and thus available network resources such as bandwidth) as displayed on a mobile device 402 are shown in a side view plane 410 and top view plane 420. When network conditions are high (e.g., high availability of bandwidth, storage, compute resources, etc.), a larger image array (e.g., the entire original image array as initially captured) may be transmitted and rendered. The rendered larger image array results in a larger cone of view 404, for example, having more look around effect wherein the viewer may be able to view the rendered content (e.g., as a 3D light field video) from a wider range of head movements. In the example, the range of head movements can be in any direction, and with the widest radius compared to the other cones of view. In another example, the largest cone of view 404 may support the widest range in other directions, such as a horizontal parallax, vertical parallax, diagonal parallax, asymmetric parallax, and so forth. The larger cone of view 404 may also support perspective-accurate viewing (e.g., viewpoint-accurate rendering of the content), as the wider radius of supported head movement can accommodate more or better viewpoints.

When network conditions drop, a reduced image array (e.g., smaller image array) may be transmitted and rendered, resulting in a smaller cone of view 406. The rendered content in the smaller cone of view 406 may be a 3D video that has more restricted look-around effect. For example, while smaller cone of view 406 can still support head movement in all directions, the look-around effect is limited to a smaller radius of viewing range than that of the larger cone of view 404.

When the network drops further (e.g., to the lowest service tier), the image array may be reduced to a single sub-aperture image. Transmission and rendering of the single sub-aperture array results in a 2D video that has no cone of view 408 (e.g., no look-around effect).

Figure 5:
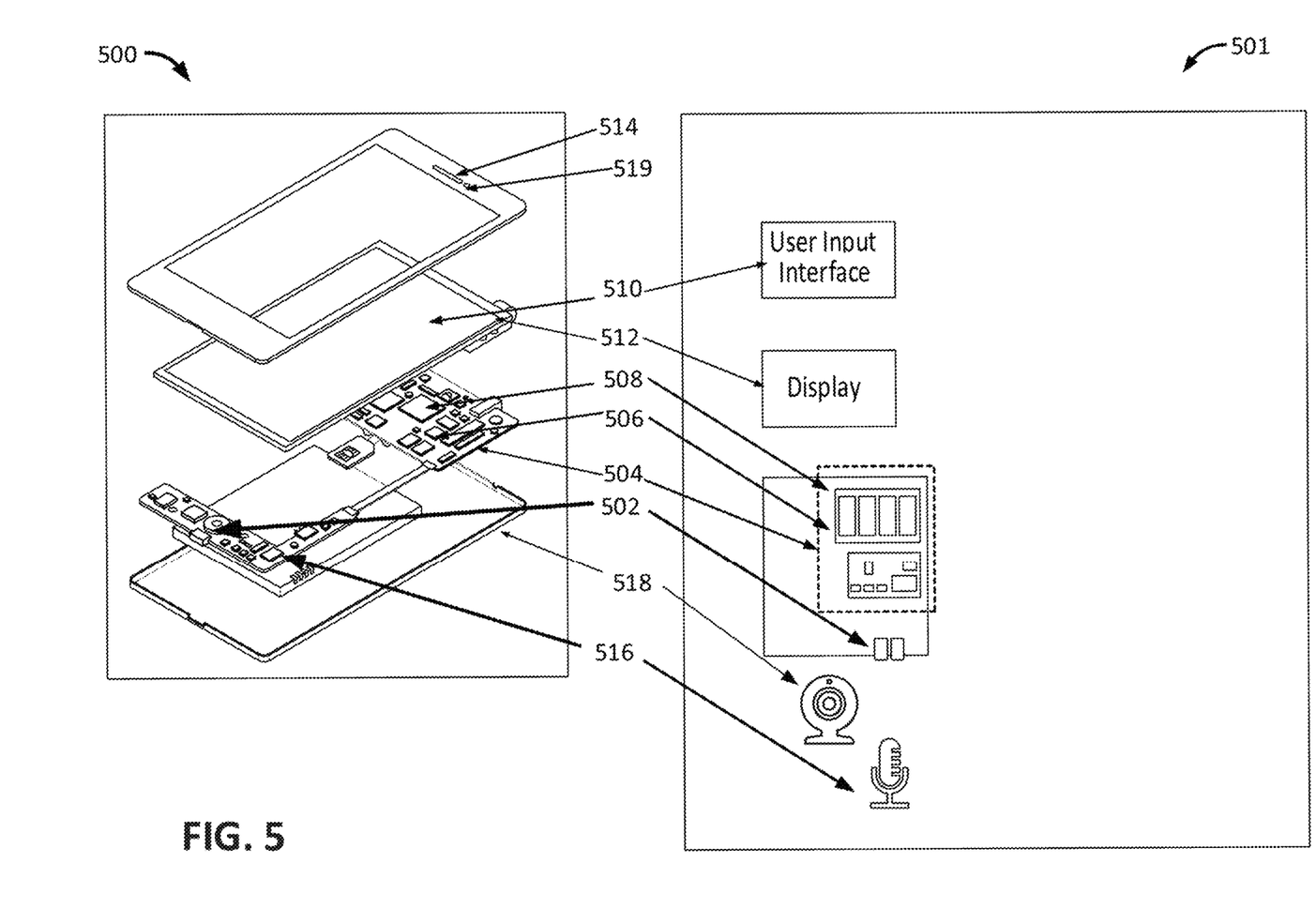
FIG. 5 shows an illustrative capture device, in accordance with some embodiments of this disclosure.

FIG. 5 shows generalized embodiments of an illustrative capture device, in accordance with some embodiments of this disclosure. In some embodiments, capture device 500 may be a smartphone device, a tablet, a virtual reality or augmented reality device, or any other suitable device capable of capturing, transmitting, and/or processing video data (e.g., light field image array). Capture device 501 may include or be communicatively connected to microphone 516, display 512, and camera 518. Camera 518 may be any suitable video camera integrated with the equipment or externally connected. For example, camera 518 may be a smart phone lens. In an embodiment, camera 518 comprises an array of cameras or camera modules. In some embodiments, camera 518 is a single camera. In yet another embodiment, camera 518 comprises a single camera lens fitted with a microlens array, or a plurality of camera lens each fitted with a microlens array. In another embodiment, camera 518 comprises a plenoptic camera. Camera 518 may be a digital camera comprising a charge-coupled device (CCD) and/or a complementary metal-oxide semiconductor (CMOS) image sensor. Camera 518 may be an analog camera that converts to digital images via a video card. For example, where camera 518 is a plenoptic camera, camera 518 may include large digital imaging sensors that place a microlens array in between the lens and the image sensor, allowing a single camera to capture an array of images from different angles and with different viewpoints. In an embodiment, capture device 500 can capture light field images of a scene or subject by rotating such that camera 518 can capture the scene or subject from multiple viewpoints, resulting in a light field image array.

In some embodiments, display 512 may be a 3D display, such as, for example, a tensor display, a light field display, a volumetric display, a multi-layer display, an LCD display or any other suitable type of display, or any combination thereof. In some embodiments, capture device components 501 may be communicatively connected to user input interface 510.

Each one of capture device 500 and capture device components 501 may receive content and data via input/output (I/O) path (e.g., circuitry) 502. I/O path 502 may provide content (e.g., broadcast programming, on-demand programming, Internet content, content available over a local area network (LAN) or wide area network (WAN), and/or other content) and data to control circuitry 504, which may comprise processing circuitry 506 and storage 508. Control circuitry 504 may be used to send and receive commands, requests, and other suitable data using I/O path 502, which may comprise I/O circuitry. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing. While a capture device 500 is shown in FIG. 5 as a mobile device for illustration, any suitable computing device having processing circuitry, control circuitry, and storage may be used in accordance with the present disclosure. For example, capture device 500 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 504 may be based on any suitable control circuitry such as processing circuitry 506. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for the codec application stored in memory (e.g., storage 508). Specifically, control circuitry 504 may be instructed by the codec application to perform the functions discussed above and below. In some implementations, processing or actions performed by control circuitry 504 may be based on instructions received from the codec application.

In client/server-based embodiments, control circuitry 504 may include communications circuitry suitable for communicating with a server or other networks or servers. The codec application may be a stand-alone application implemented on a device or a server. The codec application may be implemented as software or a set of executable instructions. The instructions for performing any of the embodiments discussed herein of the codec application may be encoded on non-transitory computer-readable media (e.g., a hard drive, random-access memory on a DRAM integrated circuit, read-only memory on a BLU-RAY disk, etc.). For example, in FIG. 5, the instructions may be stored in storage 508, and executed by control circuitry 504 of a capture device 500.

In some embodiments, the codec application may be a client/server application where only the client application resides on device 500, and a server application resides on an external server. For example, the codec application may be implemented partially as a client application on control circuitry 504 of device 500 and partially on a server application running on control circuitry. The server may be a part of a local area network with one or more of devices 500 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., a server and/or edge server), referred to as "the cloud." Capture device 500 may be a cloud client that relies on the cloud computing capabilities from the server to receive and process encoded data for 3D media content. When executed by control circuitry of the server, the codec application may instruct its control or circuitry to perform processing tasks for the client device and facilitate the encoding/decoding.

Control circuitry 504 may include communications circuitry suitable for communicating with a server, edge computing systems and devices, a table or database server, or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as codec application data described above. Nonvolatile memory may also be used (e.g., to launch a boot-up routine and other instructions). Cloud-based storage, described in relation to FIG. 5, may be used to supplement storage 508 or instead of storage 508.

Control circuitry 504 may include video generating circuitry and tuning circuitry, such as one or more analog tuners, one or more H.265 decoders or any other suitable digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of capture device 500. Control circuitry 504 may also include digital-to-analog converter circuitry and analog-to-digital converter circuitry for converting between digital and analog signals. The tuning and encoding circuitry may be used by capture device 500 and capture device components 501 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from capture device 500, the tuning and encoding circuitry (including multiple tuners) may be associated with storage 508.

Control circuitry 504 may receive instruction from a user by way of user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of capture device 500 and capture device components 501. For example, display 512 may be a touchscreen or touch-sensitive display. In such circumstances, user input interface 510 may be integrated with or combined with display 512. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons. In a further example, user input interface 510 may include a handheld remote-control device having a microphone and control circuitry configured to receive and identify voice commands and transmit information to capture device 500.

Audio output equipment (not shown) may be integrated with or combined with display 512. Display 512 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. The audio output equipment may be provided as integrated with other elements of capture device 500 and capture device components 501 or may be stand-alone units. An audio component of videos and other content displayed on display 512 may be played through speakers (or headphones) of the audio output equipment. In some embodiments, audio may be distributed to a receiver (not shown), which processes and outputs the audio via speakers of the audio output equipment. In some embodiments, for example, control circuitry 504 is configured to provide audio cues to a user, or other audio feedback to a user, using speakers of the audio output equipment. There may be a separate microphone 516 or the audio output equipment may include a microphone configured to receive audio input such as voice commands or speech. For example, a user may speak letters or words that are received by the microphone and converted to text by control circuitry 504. In a further example, a user may voice commands that are received by a microphone and recognized by control circuitry 504.

The codec application may be implemented using any suitable architecture. For example, it may be a stand-alone application wholly-implemented on capture device 500 and capture device components 501. In such an approach, instructions of the application may be stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to provide encoding/decoding functionality and preform any of the actions discussed herein. Based on the processed instructions, control circuitry 504 may determine what action to perform when input is received from user input interface 510. For example, movement of a cursor on a display up/down may be indicated by the processed instructions when user input interface 510 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the codec application is a client/server-based application. Data for use by a thick or thin client implemented on capture device 500 may be retrieved on-demand by issuing requests to a server remote to capture device 500. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 500. This way, the processing of the instructions is performed remotely by the server while the resulting displays (e.g., that may include text, a keyboard, or other visuals) are provided locally on device 500. Device 500 may receive inputs from the user via input interface 510 and transmit those inputs to the remote server for processing and generating the corresponding displays. For example, device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to device 500 for presentation to the user.

In some embodiments, the codec application may be downloaded and interpreted or otherwise run by an interpreter or virtual machine (run by control circuitry 504). In some embodiments, the codec application may be encoded in the ETV Binary Interchange Format (EBIF), received by control circuitry 504 as part of a suitable feed, and interpreted by a user agent running on control circuitry 504. For example, the codec application may be an EBIF application. In some embodiments, the codec application may be defined by a series of JAVA-based files that are received and run by a local virtual machine or other suitable middleware executed by control circuitry 504. In some of such embodiments (e.g., those employing MPEG-2 or other digital media encoding schemes), codec application may be, for example, encoded and transmitted in an MPEG-2 object carousel with the MPEG audio and video packets of a program.

Figure 6:
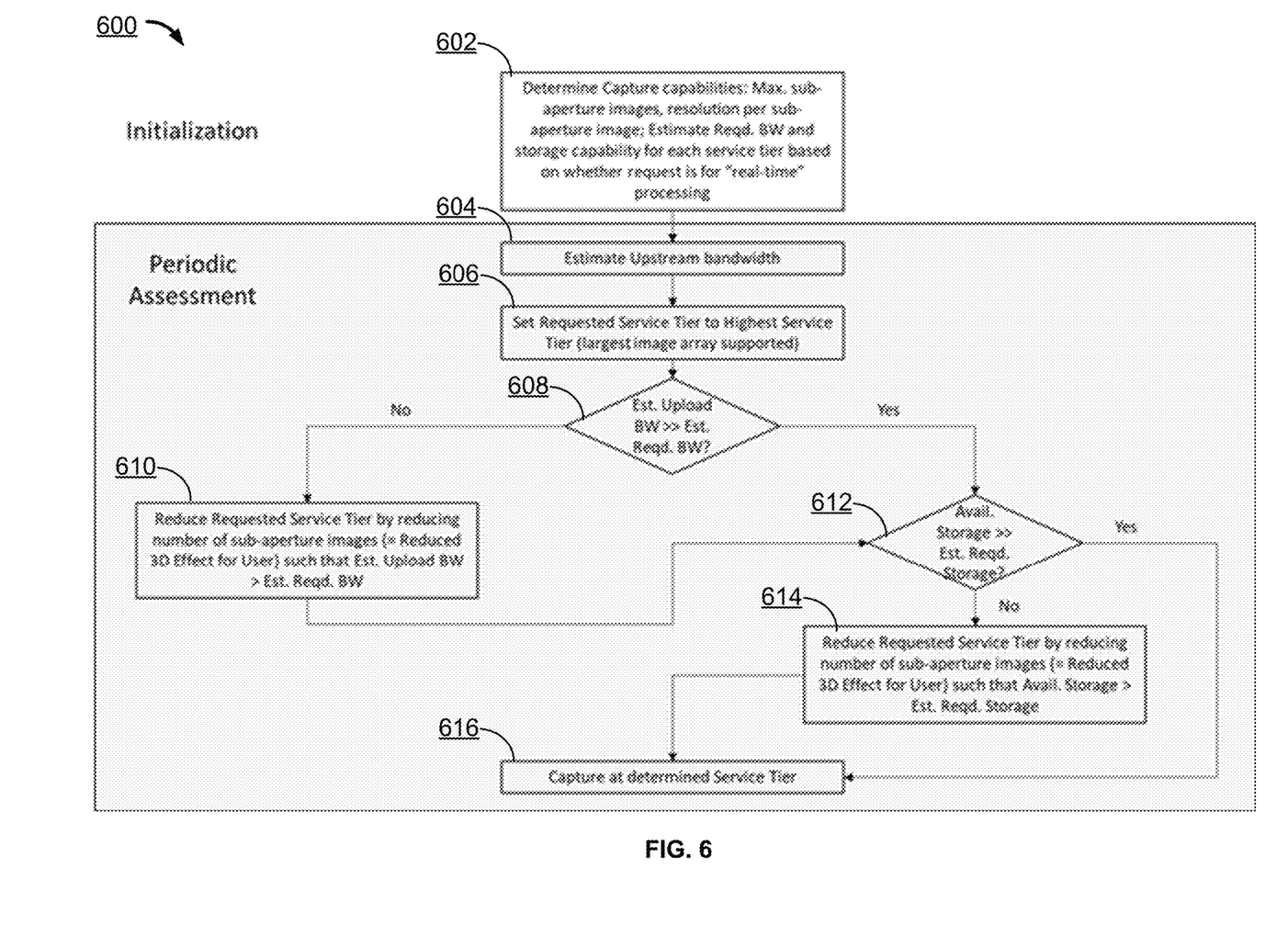
FIG. 6 is a flowchart of an exemplary process for capture and transmission of light field content in varying network conditions, in accordance with some embodiments of this disclosure.

FIG. 6 is a flowchart of an exemplary process 600 for capture and transmission of light field content in varying network conditions, in accordance with some embodiments of this disclosure. At step 602, the process determines the capture capabilities of the capture device (e.g., the capabilities of the light field camera or microlens array associated with the capture device). The camera associated with the capture device may be optimally capable of capturing an image array having a particular frame resolution (e.g., 16K, 8K, 4K, etc.) wherein each sub-aperture image has a specific resolution per view (also referred to as resolution per sub-aperture image, e.g., 1280×780, etc.) and a particular number of views per frame (also referred to as number of sub-aperture images per frame). The maximum number of sub-aperture images that can be captured in the largest image array (e.g., maximum number of views per frame) and the resolution per view of the image array that can be captured by the capabilities of the camera is determined. In an embodiment, the process identifies the initial attributes of the originally captured image array (e.g., largest image array). For example, the original image array captured by the capture device has a size equal to the maximum number of views per frame, with a frame resolution of 16K, wherein each sub-aperture image has a resolution per view of 1280× 780 p.

In the example, a request for a service tier for real-time processing (e.g., live broadcasting) of light field content may be received from the capture device. The process estimates the requested bandwidth and storage capacity for each service tier based on whether the request is for real-time processing. In an embodiment the service tiers may be preconfigured, for example by a network service provider or by user preferences. For example, if the request is made for a live broadcast, the process may estimate the bandwidth and storage required to process the original image array in real-time. In another example, if the request is made for storage of the light field content and deferring processing (e.g., not a live broadcast, but for future playback), the process may estimate a different storage required to immediately store the original image array and a different bandwidth the process it at a future time.

At step 604, the current upstream bandwidth is estimated. In an embodiment, the upstream bandwidth can be estimated periodically. At step 606, the requested service tier is set to the highest service tier (e.g., where transmission of the largest or original image array is supported). At step 608, the estimated upstream bandwidth is compared to the requested bandwidth. When the current upstream bandwidth does not exceed the requested bandwidth, the requested service tier is reduced at step 610. In an embodiment, the requested service tier is reduced by reducing the number of sub-aperture images of the image array such that the estimated upstream bandwidth is greater than the requested bandwidth. By reducing the number of sub-aperture images, the 3D effect is reduced accordingly when rendered for viewing. When the current upstream bandwidth exceeds the requested bandwidth, the process compares the current available storage (e.g., storage in a cloud system) to the requested storage at step 612. When the current available storage does not exceed the requested storage, the requested service tier is reduced by reducing the image array to a particular number (e.g., subset) of sub-aperture images. The reduced image array is captured, transmitted (or stored), and processed at the reduced service tier at step 616. Otherwise, if the current estimated bandwidth and current estimated storage both exceed the requested bandwidth and requested storage, no reduction of service tier is necessary, and the original image array is captured and transmitted as is.

Figure 7:
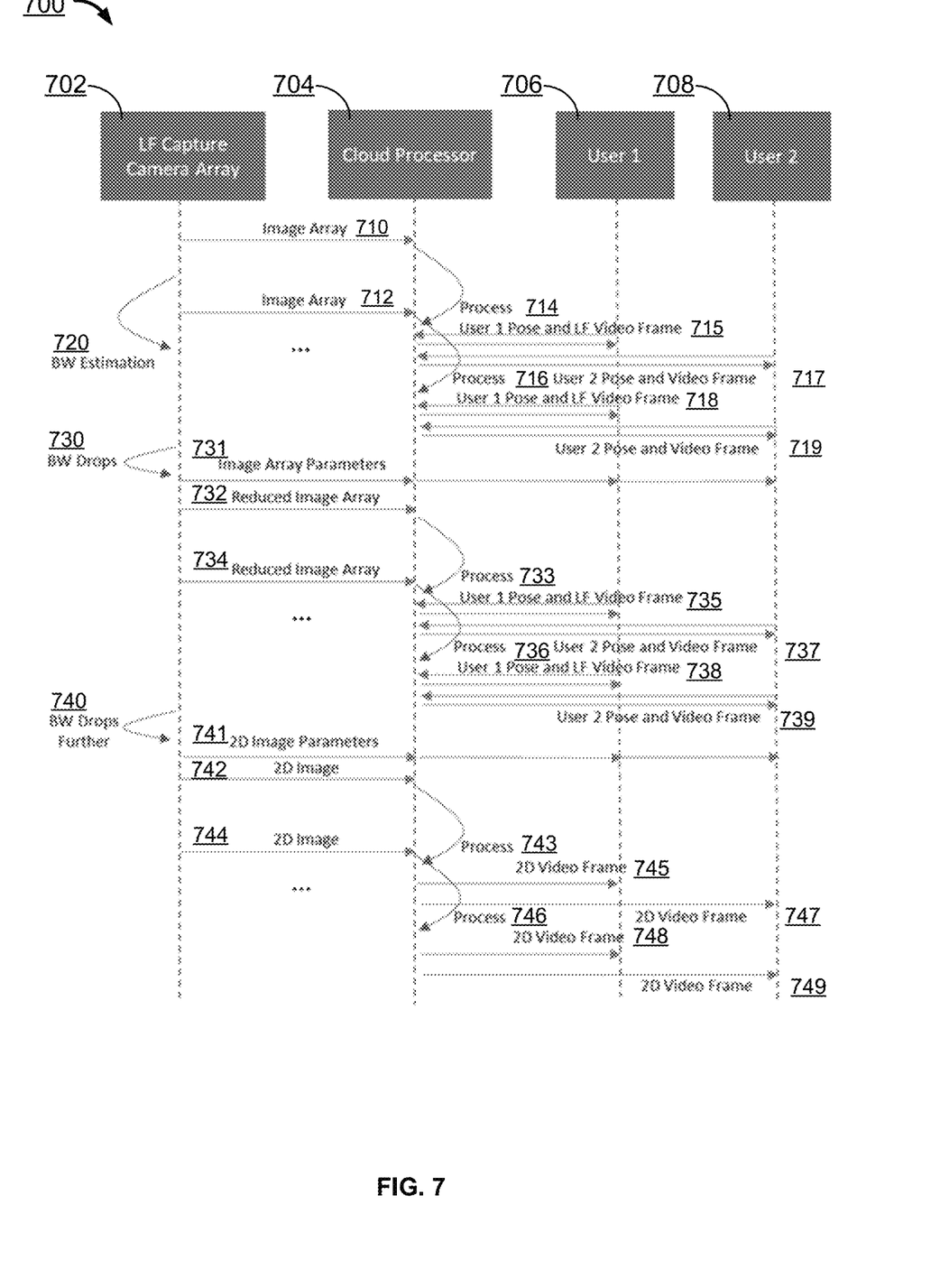
FIG. 7 is a system sequence diagram of an exemplary process for capturing and rendering light field content in response to drops in upstream bandwidth, in accordance with some embodiments of this disclosure.

FIG. 7 is a system sequence diagram of an exemplary process for capturing and rendering light field content in response to drops in upstream bandwidth, in accordance with some embodiments of this disclosure. In the example, light field content (e.g., image array) is captured by light field capture camera array 702. The image array is transmitted to a cloud processor 704 (e.g., within a cloud system), and rendered to a plurality of users (e.g., user 1 at 706 and user 2 at 708, each viewing the rendered light field content from different viewpoints or poses). When network conditions are favorable (e.g., resources are plentiful), the original captured image array is sent for processing at step 710. Network conditions, such as bandwidth (e.g., current upstream bandwidth) is periodically estimated at 720. Subsequent frames of the captured image array in their original size continue to be transmitted at 712, processed at 714, 716 and rendered for the viewpoints of each user (e.g., user 1 at 715 and 718, and user 2 at 717 and 719), respectively.

When bandwidth drops 730, a reduced service tier is determined based on the current available bandwidth. Reduced image parameters, based on the reduced service tier, are determined 731 (e. g., as explained in FIGS. 2 and 3). The reduced image array frames are transmitted 732, 734 to cloud processor 704. The reduced compute units may be allocated (e.g., image arrays are processed 733, 736 under the reduced service tier) in the cloud system. Reducing image array also reduces the cone of view of upon rendering for each user 706, 708. Because each user 706, 708 may have a different pose, viewpoint-accurate rendering (e.g., of the same reduced cone of view of the reduced image array) for each user may be different. For example, the rendered reduced image array at the first user's pose (e.g., at 735 and 738) may be more perspective-accurate (or less perspective-accurate in other examples) from the rendered reduced image array at the second user's pose (e.g., at 737 and 739).

When bandwidth drops further 740 (e.g., to the lowest bandwidth available for transmission), 2D image parameters may be applied 741. In an embodiment, a single sub-aperture image is selected from the original image array and transmitted. Therefore, each frame is sent at the same, fixed tile position (at 742, 744), resulting in a 2D image with no look-around effect (e.g., zero cone of vision) when processed at 743, 746. Thus, both users 706, 708 may view the rendered content as a 2D image (or 2D video) at 745, 748 and 747, 749, respectively.

In an embodiment, user's pose information is sent to cloud processor 704, which renders the processed image array (or reduced image array) to each user based on each user's respective pose. In another embodiment, when bandwidth drops such that only 2D video may be transmitted and processed, the users may abort sending their respective poses to the cloud processor 704 (or cloud renderer) until light field rendering (e.g., 3D video rendering) is available with a specific cone of view (e.g., when network resources, such as available bandwidth, increase and transmission and processing of more sub-aperture images per image array frame can be supported).

In an embodiment, the image arrays and reduced image arrays are transmitted and processed via an RTP protocol. When bandwidth drops (e.g., the lowest bandwidth) such that only 2D images can be supported, RTP may continue to be used. Thus, during the lowest bandwidth period, the cloud renderer (or cloud processor 704) becomes a pass-through unit rather than a computation intensive processor. In another embodiment, instead of delivering the 2D content via the cloud processor 704 or dedicated infrastructure for processing light field content, the 2D content is delivered through a generic server (e.g., an HTTP server), and a session with the cloud processor 704 can be re-established when network conditions allow for live broadcasting of light field content at a later time. The re-establishment of the connection with the cloud processor 704 can also be dependent on the content item being broadcasted. For example, the system might not re-establish a session for delivering the content in light field format if the broadcast is about to end (e.g., based on start and end time metadata associated with the broadcast, or if only a minimal number of frames are remaining for transmission).

What is claimed is:

1. A method of live broadcasting of light field media content from a capture device, comprising:
    estimating an upstream bandwidth available to the capture device for uploading content in a network;
    receiving, from the capture device, a request for a first service tier from a plurality of service tiers, wherein each service tier is based on a different network condition and is associated with a different respective quality level of network resources for transmission and processing of the light field media content captured by the capture device, the light field media content comprising an image array;
    determining that a bandwidth associated with the first service tier is greater than the estimated upstream bandwidth;
    determining a second service tier based on the estimated upstream bandwidth, wherein the second service tier is associated with a lower quality level of network resources than the first service tier;
    determining parameters for reducing the image array to a reduced image array based on the second service tier, wherein determining the parameters comprises selecting a number of sub-aperture images from the image array based on maximizing feature saliency of the image array;
    allocating, to the capture device, resources corresponding to the second service tier for transmission of the reduced image array; and
    allocating, in a cloud system, resources corresponding to the second service tier for processing the transmitted reduced image array.

2. The method of claim 1, further comprising:
    determining the bandwidth associated with the first service tier is not greater than the estimated upstream bandwidth;
    allocating, to the capture device, resources corresponding to the first service tier for transmission of the image array; and
    allocating, in the cloud system, resources corresponding to the first service tier for processing the transmitted image array.

3. The method of claim 1, further comprising:
estimating the upstream bandwidth periodically;
in response to determining a drop in the upstream bandwidth, determining the bandwidth associated with the second service tier exceeds the dropped upstream bandwidth;
determining a third service tier based on the dropped upstream bandwidth, wherein the third service tier is associated with a lower quality level of network resources than the second service tier;
determining parameters for reducing the image array to a second reduced image array;
allocating, to the capture device, resources corresponding to the third service tier for transmission of the second reduced image array; and
allocating, in the cloud system, resources corresponding to the third service tier for processing the transmitted second reduced image array.

4. The method of claim 1,
wherein the reduced image array comprises the selected sub-aperture images.

5. The method of claim 1, further comprising:
selecting each of the number of sub-aperture images from the image array such that each selected sub-aperture image is adjacent to at least one other selected sub-aperture image.

6. The method of claim 1, wherein the transmission of the reduced image array at the second service tier corresponds to a reduced cone of view of the light field media content when rendered at a display device.

7. The method of claim 6, wherein the transmission of the reduced image array at the second service tier minimizes a loss of quality of the rendered light field media content resulting from the reduced cone of view.

8. The method of claim 6, wherein a type of the reduced cone of view comprises at least one of a parallax in all cardinal directions, asymmetrical parallax, horizontal parallax, vertical parallax, or diagonal parallax.

9. The method of claim 8, further comprising:
determining, for rendering at the display device, the type of the reduced cone of view based on at least one of the second service tier, maximizing feature saliency, maximizing perspective-accurate viewing, or supporting a particular parallax.

10. The method of claim 1, wherein the resources comprise at least one of a network resource, compute resource, or storage resource.

11. The method of claim 1, wherein the capture device is coupled to at least one of a camera or a microlens array.

12. A system for live broadcasting of light field media content from a capture device, the system comprising:
input/output circuitry configured to:
receive, from the capture device, a request for a first service tier from a plurality of service tiers, wherein each service tier is based on a different network condition and is associated with a different respective quality level of network resources for transmission and processing of the light field media content captured by the capture device, the light field media content comprising an image array; and
a control circuitry configured to:
estimate an upstream bandwidth available to the capture device for uploading content in a network;
determine that a bandwidth associated with the first service tier is greater than the estimated upstream bandwidth;
determine a second service tier based on the estimated upstream bandwidth, wherein the second service tier is associated with a lower quality level of network resources than the first service tier;
determine parameters for reducing the image array to a reduced image array based on the second service tier, wherein determining the parameters comprises selecting a number of sub-aperture images from the image array based on maximizing feature saliency of the image array;
allocate, to the capture device, resources corresponding to the second service tier for transmission of the reduced image array; and
allocate, in a cloud system, resources corresponding to the second service tier for processing the transmitted reduced image array.

13. The system of claim 12, wherein the control circuitry is further configured to:
determine the bandwidth associated with the first service tier is not greater than the estimated upstream bandwidth;
allocate, to the capture device, resources corresponding to the first service tier for transmission of the image array; and
allocate, in the cloud system, resources corresponding to the first service tier for processing the transmitted image array.

14. The system of claim 12, wherein the control circuitry is further configured to:
estimate the upstream bandwidth periodically;
in response to determining a drop in the upstream bandwidth, determine the bandwidth associated with the second service tier exceeds the dropped upstream bandwidth;
determine a third service tier based on the dropped upstream bandwidth, wherein the third service tier is associated with a lower quality level of network resources than the second service tier;
determine parameters for reducing the image array to a second reduced image array;
allocate, to the capture device, resources corresponding to the third service tier for transmission of the second reduced image array; and
allocate, in the cloud system, resources corresponding to the third service tier for processing the transmitted second reduced image array.

15. The system of claim 12, wherein the reduced image array comprises the selected sub-aperture images.

16. The system of claim 12, wherein the control circuitry is further configured to:
select each of the number of sub-aperture images from the image array such that each selected sub-aperture image is adjacent to at least one other selected sub-aperture image.

17. The system of claim 12, wherein the transmission of the reduced image array at the second service tier corresponds to a reduced cone of view of the light field media content when rendered at a display device.

18. The system of claim 17, wherein a type of the reduced cone of view comprises at least one of a parallax in all cardinal directions, asymmetrical parallax, horizontal parallax, vertical parallax, or diagonal parallax.

* * * * *